A. R. BAKER.
MOUNTING FOR MAGNETO IGNITERS.
APPLICATION FILED JULY 20, 1918.

1,306,134. Patented June 10, 1919.

Witness
Robert Liebrich

Inventor
Arthur R. Baker,
By
Hood & Ashley
Attorneys

UNITED STATES PATENT OFFICE.

ARTHUR R. BAKER, OF INDIANAPOLIS, INDIANA, ASSIGNOR TO HERCULES ELECTRIC COMPANY, OF INDIANAPOLIS, INDIANA, A CORPORATION OF INDIANA.

MOUNTING FOR MAGNETO-IGNITERS.

1,306,134.

Specification of Letters Patent.

Patented June 10, 1919.

Application filed July 20, 1918. Serial No. 245,850.

*To all whom it may concern:*

Be it known that I, ARTHUR R. BAKER, a citizen of the United States, residing at Indianapolis, in the county of Marion and State of Indiana, have invented a new and useful Mounting for Magneto-Igniters, of which the following is a specification.

It is the object of my invention to improve the mounting of the igniter contacts and the oscillating ignition magneto of an internal combustion engine; whereby the supporting bracket may be more strongly as well as more cheaply made, the strain on the magneto parts is minimized, the machining of the bracket is much simplified by having the holes therethrough all parallel, metal is saved, and the supporting shelf ordinarily projecting beneath the magneto from the bracket is eliminated.

Figure 1:
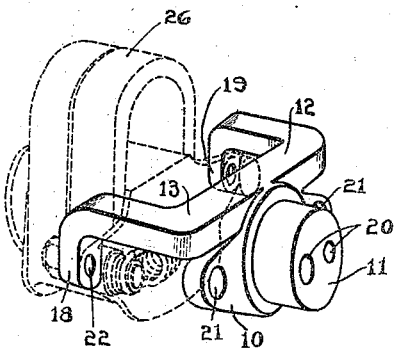
Figure 2:
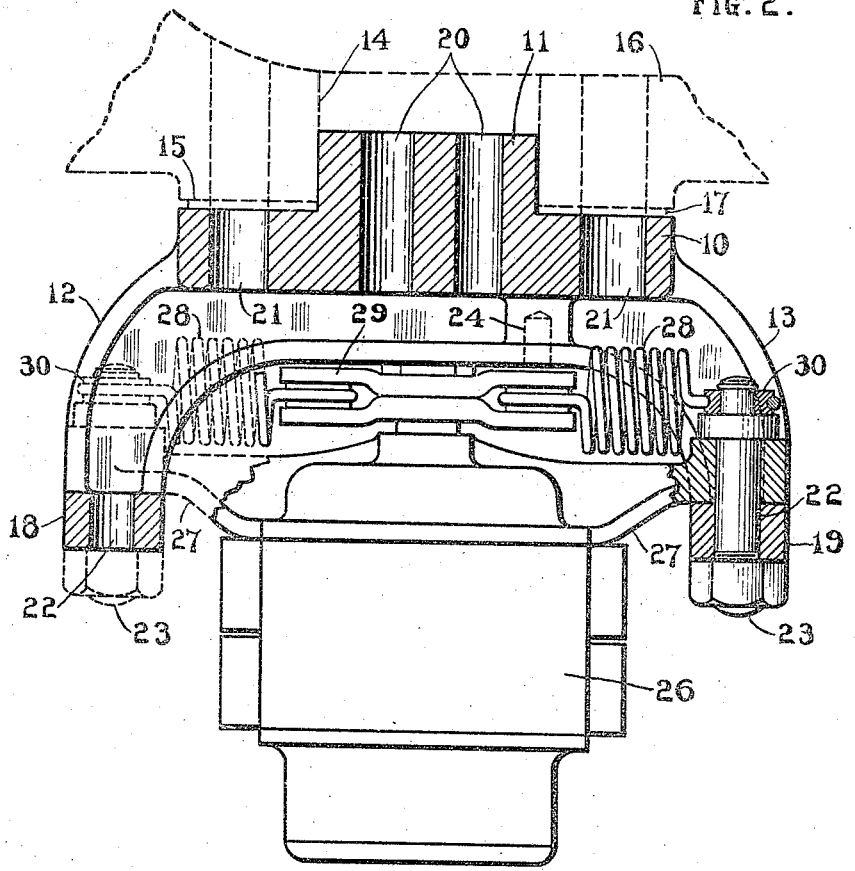

The accompanying drawing illustrates my invention. Figure 1 is a perspective view of my improved bracket, indicating the associated magneto in dotted lines; and Fig. 2 is a horizontal section through the bracket, looking from the bottom, showing in bottom plan the associated magneto and in dotted lines part of the associated engine.

My improved bracket comprises a bolt flange 10 with the usual bolt ears, from one face of which flange projects a plug 11 which carries the igniter contacts, and from the body of which project two arms 12 and 13. The plug 11 and the adjacent face of the bolt flange 12 may be properly machined to fit within the ignition opening 14 and against the machined face of a boss 15 of the engine cylinder 16, a gasket 17 usually being provided between such bolt flange and said boss. The arms 12 and 13, as shown, extend from the bolt flange 10 in opposite directions in the plane of such bolt flange, and beyond the bolt ears are turned outwardly from such plane in the opposite direction from the plug 11. From the outer ends of the arms two fingers 18 and 19 project at an angle. The body of the arms 12 and 13 is preferably offset from the bolt ears of the bolt flange 10 to facilitate the insertion of bolts in the bolt ears. The arms 12 and 13 are conveniently channel-shaped, save at their ends 18 and 19, with the open side of the channel downward as shown; and as shown are continuations of each other where they pass across the bolt flange 10.

The plug 11 is provided with two holes 20 for the igniter contacts, the bolt ears of the flange 10 with two holes 21 for the bolts by which the bracket is fastened to the cylinder wall 16, and each finger 18 and 19 with a hole 22 for the supporting bolts 23 for the magneto. In addition, a hole 24 is provided for receiving a pin for holding one end of the operating spring of the movable igniter contact mounted in one of the holes 20. The holes 20, 21, 22, and 24 are all parallel to each other, so that they may all be drilled with a single setting of the bracket. This greatly facilitates the manufacture of the bracket, and decreases its cost.

The magneto 26 is provided with a cross arm 27 in the usual manner, which cross arm supports the outer ends of the springs 28 which tend to return the movable member 29 of the magneto to its normal position. Such is a usual construction. However, I use the cross arm 27 for the additional function of supporting the magneto 26, by attaching the outer ends of such cross arms to the fingers 18 and 19 of the bracket by the attaching bolts 23. These attaching bolts may also serve as supports for the rollers 30 to which the outer ends of the springs 28 are attached.

By thus supporting the magneto from the ends of the cross arm 27: I economize in both the material and labor required for making the bracket; I eliminate the necessity for a supporting shelf beneath the bracket, and for the additional work which would be required for drilling the holes through such supporting plate at an angle to the other holes; in addition, I get a stronger construction, with less strain on the magneto parts, by avoiding the transmission of stresses through the magneto frame in the operation of the device and transmitting such stresses from the arms 12 and 13 directly to the ends of the cross arm 27. As a result, I not only produce a saving in the original manufacture, but minimize breakage both in the bracket itself and in the magneto.

I claim as my invention:

1. A supporting bracket for oscillating magnetos and igniter contacts, comprising a bolt flange having a projecting igniter-supporting plug, and a pair of arms projecting from said bolt flange to coöperate with and support the cross arm of an oscillating magnet, the ends of said arms being turned at an angle to the body of said arms.

2. A supporting bracket for oscillating magnetos and igniter contacts, comprising a bolt flange having a projecting igniter-supporting plug, and a pair of arms projecting from said bolt flange to coöperate with and support the cross arm of an oscillating magnet.

3. A supporting bracket for oscillating magnetos and igniter contacts, comprising a bolt flange having a projecting igniter-supporting plug, and a pair of arms projecting from said bolt flange to coöperate with and support the cross arm of an oscillating magnet, said plug and said bolt flange and said arms being provided with holes for the reception of the igniter contacts and of the associated bolts, all of which holes are parallel.

4. An oscillating magneto having a projecting cross arm to which are attached the outer ends of the returning springs for the oscillating member of the magneto; in combination with a supporting bracket having two arms which are attached to the projecting ends of said cross arm to support the magneto thereby.

5. An oscillating magneto having fixed and oscillating members, said fixed member being provided with a cross arm, in combination with a supporting bracket having a pair of arms for coöperating with the ends of said cross arm, attaching bolts for attaching said bracket arms to the ends of said cross arms respectively; and returning springs for the oscillating member of said magneto, the outer ends of said springs being supported on said attaching bolts.

6. An oscillating magneto having a projecting cross arm; in combination with a supporting bracket having two arms which are attached to the projecting ends of said cross arms to support the magneto thereby.

7. An oscillating magneto having a projecting arm; in combination with a supporting bracket attached to said arm to support the magneto thereby.

8. An oscillating magneto having a projecting arm to which is attached one end of a returning spring for the oscillating member of the magneto; in combination with a supporting bracket attached to said arm to support the magneto thereby.

In witness whereof, I have hereunto set my hand at Indianapolis, Indiana, this 18th day of July, A. D. one thousand nine hundred and eighteen.

ARTHUR R. BAKER.